United States Patent [19]

Harvey

[11] Patent Number: 4,650,304

[45] Date of Patent: Mar. 17, 1987

[54] PSEUDO FORMAT CAMERA AND SPECIAL FILM CARTRIDGE

[75] Inventor: Donald M. Harvey, Webster, N.Y.

[73] Assignee: Eastman Kodak Company, Rochester, N.Y.

[21] Appl. No.: 765,977

[22] Filed: Aug. 15, 1985

[51] Int. Cl.⁴ .............................................. G03B 7/00
[52] U.S. Cl. ........................................................ 354/21
[58] Field of Search ................. 354/21, 105, 106, 200, 354/201, 222, 166, 119, 199, 151; 355/39, 40

[56] References Cited

U.S. PATENT DOCUMENTS

| | | | |
|---|---|---|---|
| 2,187,246 | 1/1940 | Nerwin | 354/222 X |
| 3,212,422 | 10/1965 | Nerwin et al. | 354/199 |
| 3,490,844 | 1/1970 | Sapp, Jr. | 355/40 |
| 3,765,313 | 10/1973 | Faris et al. | 354/222 X |
| 4,077,041 | 2/1978 | Imura | 354/21 |
| 4,357,102 | 11/1982 | Taren et al. | 355/77 |
| 4,583,831 | 4/1986 | Harvey | 354/106 |

Primary Examiner—Michael L. Gellner
Assistant Examiner—Brian W. Brown
Attorney, Agent, or Firm—Roger A. Fields

[57] ABSTRACT

A photographic camera is adapted to receive a conventional film cartridge for taking exposures for use in producing normal prints and a special film cartridge for taking exposures for use in producing pseudo telephoto or pseudo panoramic prints made by enlarging a selected portion of a negative. The special cartridge is distinguishable physically or otherwise from a conventional cartridge to permit the special cartridge to be routed at the photofinisher to corresponding equipment for producing the pseudo format prints. The camera is capable of distinguishing between the special cartridge and a conventional one to prevent the camera from operating in a pseudo format mode (though permitting it to operate in a regular format mode) whenever a conventional cartridge is received in the camera.

9 Claims, 16 Drawing Figures

| OPERATING MODE | PSEUDO PAN | ACTUAL ZOOM | | PSEUDO TELE(ZOOM) | | |
|---|---|---|---|---|---|---|
| CAMERA OBJECTIVE: | | | | | | |
| ACTUAL FOCAL LENGTH | 35mm | 35mm ↔ 80mm | | 80mm | 80mm | 80mm |
| MAGNIFICATION | 1.0X | 1.0X ↔ 2.3X | | 2.3X | 2.3X | 2.3X |
| EQUIVALENT FOCAL LENGTH | 35mm | SAME AS ACTUAL | | 120mm | 160mm | 200mm |
| MAGNIFICATION | 1.0X | 1.0X ↔ 2.3X | | 3.4X | 4.6X | 5.7X |
| FINDER IMAGE | [image] | [image] | [image] | [image] | [image] | [image] |
| WIDTH-TO-LENGTH RATIO | 1:2 | 3½:5 | 3½:5 | 3½:5 | 3½:5 | 3½:5 |
| PORTION OF NEGATIVE USED TO MAKE PRINT | [image] 16.4x32.8mm | [image] 23x32.8mm | [image] 23x32.8mm | [image] 16.4x23.4mm | [image] 12.8x16.3mm | [image] 9.2x13.1mm |
| PRINT SIZE | 3½ x 7ins | 3½ x 5ins | 3½ x 5ins | 3½ x 5ins | 3½ x 5ins | 3½ x 5ins |
| CODE FIDUIAL | 1000 | 0000 | 0000 | 0100 | 0010 | 0001 |

PSEUDO FORMAT CAMERA AND SPECIAL FILM CARTRIDGE

CROSS REFERENCE TO RELATED APPLICATIONS

Reference is made to commonly assigned, copending patent applications Ser. No. 717,053, filed Mar. 28, 1985 in the name of Donald M. Harvey and entitled PSEUDO TELEPHOTO—PSEUDO PANORAMIC CAMERA, Ser. No. 743,470, filed June 11, 1985 in the name of Donald M. Harvey and entitled PSEUDO FORMAT CAMERA WITH ZOOM FINDER, and Ser. No. 747,515, filed June 21, 1985 in the name of Donald M. Harvey and entitled PSEUDO FORMAT CAMERA WITH EXPOSURE CONTROL.

BACKGROUND OF THE INVENTION

1. Field of the Invention

The invention relates generally to a photographic camera for enabling pseudo telephoto and/or pseudo panoramic prints to be produced from normal exposures taken with the camera, by coding each exposure to identify a selected pseudo format. More particularly, the invention relates to a camera adapted to receive a conventional film cartridge for taking exposures for use in producing normal prints and a special film cartridge for taking exposures for use in producing pseudo telephoto and/or pseudo panoramic prints. The special cartridge is distinguishable from a conventional cartridge to permit it to be routed at the photofinisher to particular equipment for producing pseudo telephoto and pseudo panoramic prints.

2. Description of the Prior Art

A pseudo telephoto print is one that is made from a central portion of an exposure having the same width-to-length ratio, e.g. 3½:5, as that of the exposure. During the printing process, the negative is masked at its upper, lower, left and right marginal zones, leaving the central portion of the negative unobscured. Alternatively, the film gate in the enlarger may be correspondingly masked or adjusted. Then, an enlargement is made of the central portion of the negative to provide a print with the same width-to-length ratio as that of the central portion. Thus, the print will have a telephoto or close-up format.

A pseudo panoramic print is one that is made from a narrow portion of an exposure having a greater width-to-length ratio, e.g., 1:3, than that of the exposure. During the printing process, the negative is masked at its upper and/or lower marginal zones, leaving the narrow portion of the negative unobscured. Alternatively, the film gate in the enlarger may be correspondingly masked or adjusted. Then an enlargement is made of the narrow portion of the negative to provide a print with the same width-to-length ratio as that of the narrow portion. Thus, the print will have a panoramic or elongate format.

Commonly assigned U.S. Pat. No. 3,490,844, granted Jan. 20, 1970, discloses a method of making a print of a selected portion of a subject to be photographed. The method comprises the following steps: (1) viewing the subject in the viewfinder of a camera; (2) manually adjusting mechanical masking members visible in the viewfinder to frame a selected portion of the subject; (3) exposing the film in the camera to obtain a latent image of the subject; (4) encoding the exposure on the film with indicia which represents the selected portion of the subject; (5) processing the film to obtain a negative of the latent image of the subject; and (6) sensing the indicia to make a print of the selected portion of the subject from the negative.

When, in U.S. Pat. No. 3,490,844, the selected portion of the subject has the same relative position in the viewfinder as a corresponding portion of the exposure, enlargement of the portion in the negative will provide a pseudo telephoto effect similar to the actual telephoto effect provided by a telephoto lens. Thus, a pseudo telephoto print can be made during the printing process from an exposure taken without a telephoto lens.

Another patent, U.S. Pat. No. 4,357,102, granted Nov. 2, 1982, discloses a method of making a pseudo panoramic print from an exposure. According to the method, a window in the viewfinder of a camera has its upper and/or lower marginal zones masked off by an appropriate insert to provide a viewing area with a width-to-length ratio greater than 1:2 and preferably 1:3. Exposures are taken with the window partially masked and, during the printing of the negatives, the film gate in the enlarger is correspondingly masked or provided with an aperture of the same width-to-length ratio as that of the unobscured portion of the window. Printing paper with a similar width-to-length ratio is used. Prints can thus be obtained which have a panoramic or elongate format, without using a panoramic lens.

Although U.S. Pat. No. 3,490,844 discloses a method of making pseudo telephoto prints from exposures taken without a telephoto lens, and U.S. Pat. No. 4,357,102 discloses a method of making pseudo panoramic prints from exposures taken without a panoramic lens, in each instance the exposures are made on film in a conventional (standard) cartridge. Thus, unless otherwise provided by the photographer, there is no indication to the photofinisher that the conventional cartridge was used in a pseudo telephoto or pseudo panoramic camera, rather than a regular camera. During the photofinishing process, a cartridge containing film on which exposures have been made for use in producing pseudo telephoto or pseudo panoramic prints will be indistinguishable from a cartridge containing film on which exposures have been made for use in producing normal prints. Consequently, film on which exposures have been made for use in producing pseudo telephoto or pseudo panoramic prints may not be correctly routed to the special equipment described in the patents for producing pseudo telephoto or pseudo panoramic prints.

SUMMARY OF THE INVENTION

According to the invention, there is provided a camera adapted to receive a conventional film cartridge for taking exposures for use in producing normal prints and a special film cartridge for taking exposures for use in producing pseudo telephoto and/or pseudo panoramic prints made by enlarging a selected portion of a negative. The special cartridge is distinguishable physically or otherwise from a conventional cartridge to permit the special cartridge to be routed at the photofinisher to corresponding equipment for producing pseudo telephoto and pseudo panoramic prints. The camera is capable of distinguishing between the special cartridge and a conventional one to prevent the camera from operating in a pseudo format mode (though permitting it to operate in a regular format mode) whenever a conventional cartridge is received in the camera.

More particularly, the camera has manually operated means for selecting a pseudo telephoto or pseudo panoramic field of view reduced from the actual field of view of the objective lens. A viewfinder in the camera includes optical means, responsive to operation of the manually operated means to select a pseudo telephoto or pseudo panoramic field of view, for reducing the finder field of view to see the selected pseudo field of view in the viewfinder. Code means, responsive to operation of the manually operated means to select a psuedo field of view, encodes an exposure on film in the special cartridge with indicia representative of the selected pseudo field of view. Control means in the loading chamber of the camera distinguishes between a conventional cartridge and the special cartridge to prevent operation of the manually operated means to select a pseudo field of view whenever the received cartridge is a special one.

Thus, with the invention, there can be no failure at the photofinisher to identify a cartridge containing film on which exposures have been made for use in producing pseudo format prints. Moreover, the means in the camera for taking exposures for use in producing pseudo format prints is disabled whenever a conventional cartridge is received in the camera (though the camera can then take exposures for use in producing normal prints).

BRIEF DESCRIPTION OF THE DRAWINGS

The invention will be described in connection with the drawings, wherein.

DESCRIPTION OF THE PREFERRED EMBODIMENT

The invention is disclosed as being embodied preferably in a single-lens-reflex (SLR) 35 mm camera having a zoom objective lens. Because such a camera and lens are well known, this description is directed in particular to photogaphic elements forming part of or cooperating directly with the disclosed embodiment. It is to be understood, however, that other elements not specifically shown or descibed may take various forms known to persons of ordinary skill in the art.

Figure 1:
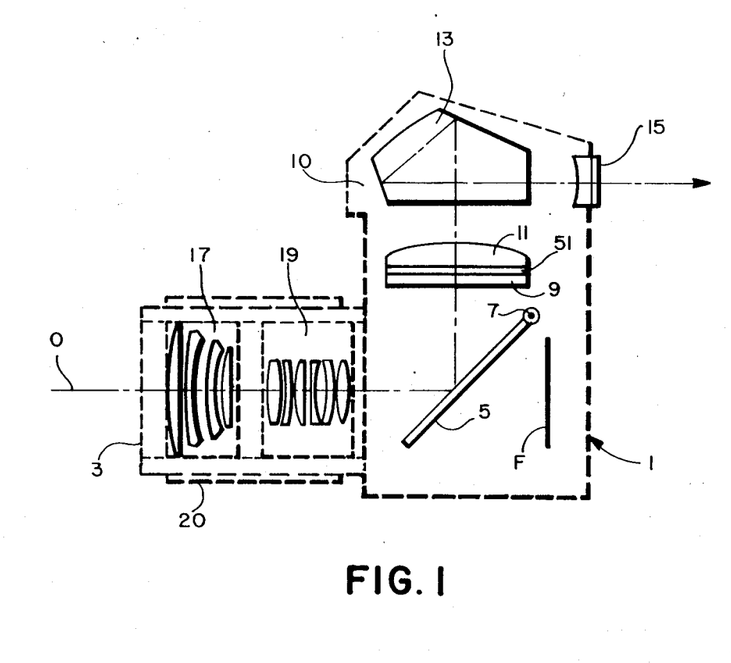
FIG. 1 is a side elevation view of a single-lens-reflex (SLR) camera adapted to receive a conventional film cartridge for taking exposures for use in producing normal prints and a special film cartridge for taking exposures for use in producing pseudo telephoto and pseudo panoramic prints, according to a preferred embodiment of the invention.

Referring now to the drawings, and in particular to FIG. 1, there is shown a single-lens-reflex (SLR) 35 mm camera 1. The camera 1 includes an objective lens 3 for focusing an image of a subject being photographed on a frame section F of film in the camera. Conventional means, such as a pressure plate and a pair of rails, not shown, support the film frame F in the focal plane of the objective lens 3 to take an exposure. A flip-up mirror 5 is located between the objective lens 3 and the film frame F. The mirror 5 is normally disposed at an angle of 45°, centered on the optical axis O of the objective lens 3, but can flip up about a pivot pin 7 to lie flat. When the mirror 5 is disposed at the 45° angle, it reflects the rays of light that come through the objective lens 3 onto a ground glass screen 9 in a viewfinder 10 of the camera 1. A field lens 11 and a penta-roof prism 13 in the viewfinder 10 direct the light rays through an eyelens 15 at the rear of the camera 1 to enable the subject to be photographed to be viewed through the objective lens 3. The prism 13 has three reflecting surfaces which turn the image formed by the objective lens 3 on the ground glass screen 9 upright as well as right-way-round. When the mirror 5 is flipped up to lie flat, it covers the underside of the ground glass screen 9 and the light rays from the objective lens 3 fall on the film frame F. The position of the mirror 5 is so arranged that when an image of the subject to be photographed is focused on the ground glass screen 9, with the mirror at the 45° angle, the same image falls into focus on the film frame F when the mirror is flipped out of the way. Finger pressure against a shutter release, not shown, on the outside of the body of the camera 1 flips the mirror 5 up. At first the light rays fall only on the blind of a focal plane shutter, not shown, but as the mirror 5 reaches the upper limit of its travel, it presses against a stop which releases the shutter blades to make the exposure.

Figure 5:
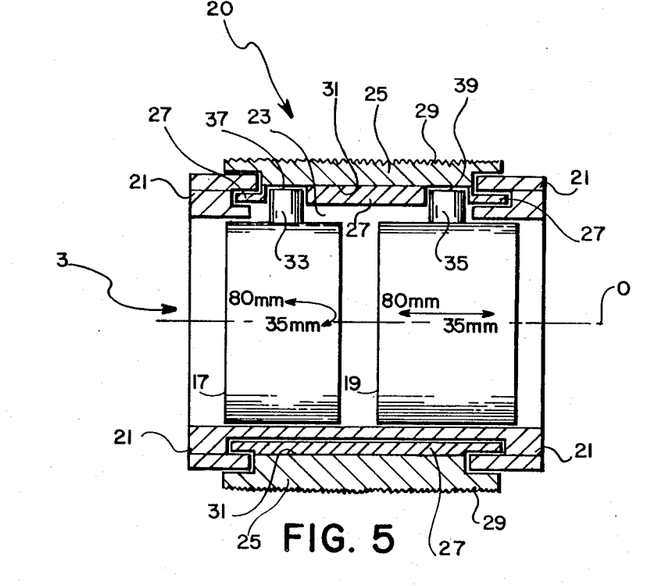
FIG. 5 is a partial sectional view of the camera objective and the manually operated member.
Figure 6:
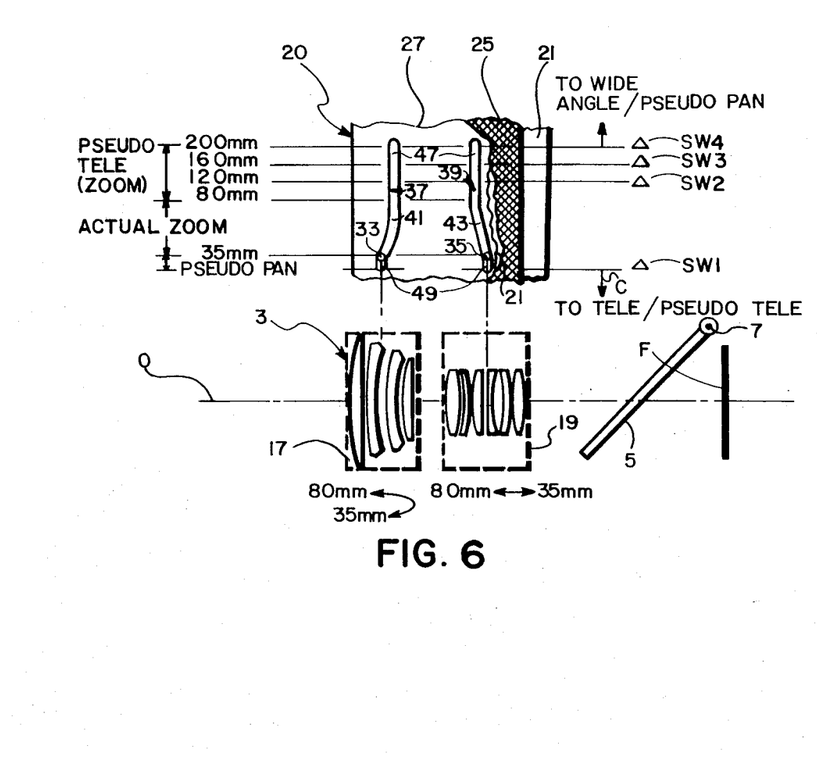
FIG. 6 is a schematic diagram of the camera objective and the manually operated member.

The objective lens 3 in the camera 1 is a known type of zoom lens, that is, a lens of variable focal length which can be adjusted continuously by movement of separate groups of elements in the lens to change the focal length of the lens. This is done in order to vary the angular field of view (coverage) of the objective lens 3 between a wide-angle limit and a telephoto limit. Alternatively, a lens assembly may be provided having a plurality of interchangeable elements for changing the focal length or angular field of view. As shown in FIGS. 1, 5 and 6, the objective lens 3 includes a front four-element section 17 which moves in a double action path along the optical axis O, first back (rearward) and then forward as the focal length of the lens is changed from a wide angle limit of, for example, 35 mm, to a telephoto limit of, for example, 80 mm. Conversely, a rear six-element section 19 of the objective lens 3 moves forward along the optical axis O in an almost smooth, linear path as the focal length of the lens is adjusted from 35 mm to 80 mm. At the shortest focal length of the objective lens 3, i.e., the wide-angle limit 35 mm, the front and rear sections 17 and 19 of the lens are farthest apart and the angular field of view is approximately 63°. At the longest focal length of the objective lens 3, i.e., the telephoto limit 80 mm, the angular field of view is approximately 28°. Thus, the field range of the objective lens 3 is 63° to 28°.

Figure 4:
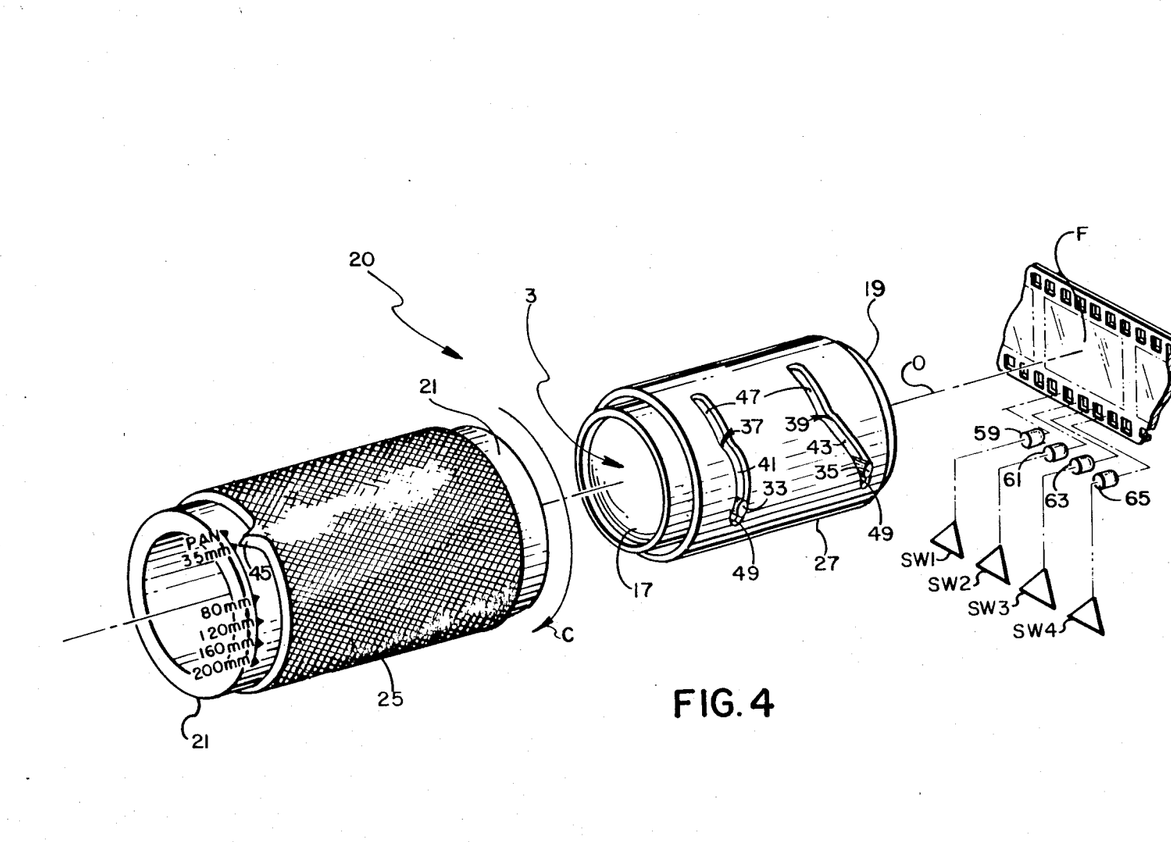
FIG. 4 is an exploded perspective view of the camera objective, a manually operated member for selecting a pseudo telephoto or pseudo panoramic field of view reduced from the actual field of view of the objective, and code means for encoding an exposure with indicia representative of the selected pseudo field of view.

Manually operated means 20 for moving the front and rear sections 17 and 19 of the objective lens 3 to adjust the lens to a selected focal length from 35 mm to 80 mm is shown in FIGS. 4-6. FIG. 4 shows the manually operated means 20 in an exploded perspective form. FIG. 5 shows such means 20 in a sectional form. FIG. 6 shows the means 20 in a rolled out (flat) elevational form. As seen in FIG. 5, a cylindrical barrel 21 fixed to the camera body supports the front and rear sections 17 and 19 of the objective lens 3 for movement along the optical axis O. The fixed barrel 21 has a semi-annular opening 23 which is bridged in light-trapping relation by an exterior zoom ring 25 and an interior cam ring 27. The zoom ring 25 has a knurled outer surface 29 and is secured at an inner surface 31 to the cam ring 27. The respective rings 25 and 27 are supported on exterior and interior surfaces of the barrel 21 for rotation relative to the barrel, about the front and rear sections 17 and 19 of the objective lens 3. The front and rear sections 17 and 19 have respective cam followers 33 and 35 which project into different-shaped cam slots 37 and 39 in the cam ring 27 to adjust the objective lens 3 from its 35 mm focal length to its 80 mm focal length or vice-versa. The different shape of the cam slots 37 and 39, and respective settings of the cam ring 27 for adjusting the objective lens 3 to the 35 mm focal length and the 80 mm focal length, are depicted in FIGS. 4 and 6. When, as viewed in FIGS. 4 and 6, the cam ring 27 is rotated in a clockwise direction C (by turning the zoom ring 25 in the same direction) from the 35 mm setting to the 80 mm setting of the cam ring, the front section 17 of the objective lens 3 first moves rearward and then moves forward because of a curved segment 41 of the cam slot 37. Simultaneously, the rear section 19 of the objective lens 3 simply moves forward because of a straight, inclined segment 43 of the cam slot 39. This movement of the front and rear sections 17 and 19 adjusts the objective lens 3 to continuously change its focal length from 35 mm to 80 mm.

A pointer 45 is provided on the zoom ring 25 for alignment with respective visible indications of the 35 mm and 80 mm settings of the cam ring 27. As shown in FIG. 4, the indications are embossed on the outside of the cylindrical barrel 21.

As is apparent from FIG. 6, the cam ring 27 can be rotated in the clockwise direction C beyond its 80 mm setting (by similarly turning the zoom ring 25) to a plurality of pseudo telephoto settings, 120 mm, 160 mm and 200 mm, without moving the objective lens 3 from its longest (telephoto) focal length 80 mm. This is possible because of respective, non-inclined, identical dwell segments 47 in the two cam slots 37 and 39. Conversely, the cam ring 27 can be rotated in a counter-clockwise direction beyond its 35 mm setting (by similarly turning the zoom ring 25) to a pseudo panoramic setting, without moving the objective lens 3 from its shortest (wide-angle) focal length 35 mm. This is possible because of respective, non-inclined, identical dwell segments 49 in the two cam slots 37 and 39. Visible indications of the psuedo telephoto settings 120 mm, 160 mm and 200 mm of the cam ring 27 and the pseudo panoramic setting of the cam ring are embossed on the outside of the cylindrical barrel 21, beyond the 80 mm and 35 mm indications on the barrel, for alignment with the pointer 45 on the zoom ring 25.

Figure 7A:
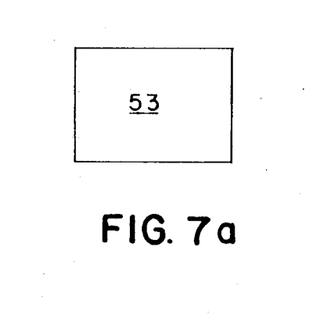
FIGS. 7a–7e are elevation views of the finder field in the viewfinder of the camera, illustrating operation of a liquid crystal display (LCD) masking unit for partially masking the viewing area in various degrees to frame a particular portion of the subject to be photographed, in accordance with the selected pseudo field of view.
Figure 7B:
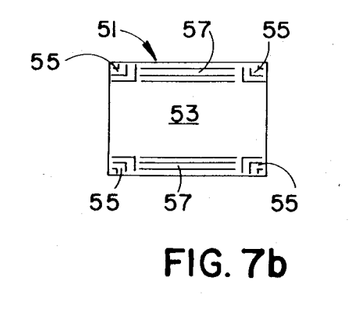
Figure 7C:
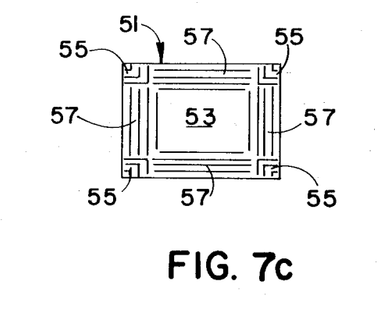
Figure 7D:
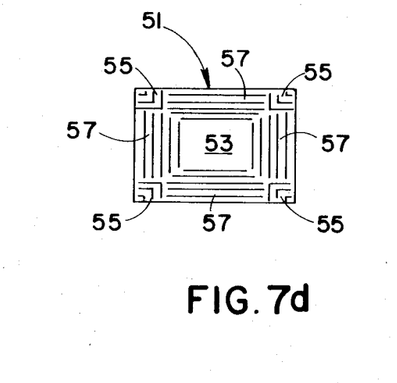
Figure 7E:
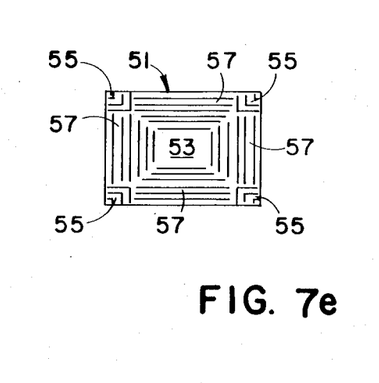

A flat, liquid crystal display (LCD) masking unit 51 is located in the viewfinder 10 of the camera 1 between the ground glass screen 9 and the field lens 11, as shown in FIG. 1. The LCD masking unit 51 is a variation of a known type of unit, such as described in U.S. Pat. No. 4,478,493, granted Oct. 23, 1984, and is depicted in FIGS. 7b-7e in various masking configurations in the finder field 53 of the viewfinder 10. The respective configurations correspond to the pseudo panoramic and pseudo telephoto settings of the cam ring 27. As shown in FIG. 7e, the masking unit 51 comprises four sets of right-angle insulated strips 55 of transparent, electrically conductive material arranged in side-by-side relation in the respective corner zones of the finder field 53 and four sets of elongate insulated strips 57 of the same material arranged in side-by-side relation in the upper, lower, left and right marginal zones of the finder field, Preferably, each set of the right-angle strips 55 includes three strips, and each set of the elongate strips 57 includes six strips. When the right-angle strips 55 and the elongate strips 57 are selectively energized in accordance with the pseudo panoramic or pseudo telephoto settings of the cam ring 27, they are individually rendered opaque to partially mask the finder field 53 in various degrees, as shown in FIGS. 7b-7e. FIG. 7a illustrates the finder field 53 as it appears with the masking unit 51 de-energized, which is the situation when the cam ring 27 is rotated from its 35 mm setting to its 80 mm setting or vice-versa. In this instance, none of the right-angle strips 55 or the elongate strips 57 are visible in the finder field 53. FIG. 7b illustrates the finder field 53 as it appears with the masking unit 51 minimally energized to provide a pseudo panoramic format, which is the situation when the cam ring 27 is in its pseudo panoramic setting. In this instance, three of the elongate strips 57 in the upper and lower marginal zones and all of the right-angle strips 55 in the corner zones are visible in the finder field 53. FIG. 7c illustrates the finder field 53 as it appears with the masking unit 61 further energized to provide a pseudo telephoto format akin to a 120 mm focal length, which is the situation when the cam ring 27 is in its 120 mm pseudo telephoto setting. In this instance, four of the elongate strips 57 in the upper, lower, left and right marginal zones and all of the right-angle strips 55 in the corner zones are visible in the finder field 53. FIG. 7d illustrates the finder field as it appears with the masking unit even further energized to provide a pseudo telephoto format akin to a 160 mm focal length, which is the situation when the cam ring is in its 160 mm pseudo telephoto setting. In this instance, five of the elongate strips in the marginal zones and all of the right-angle strips in the corner zones are visible in the finder field. FIG. 7e illustrates the finder field as it appears with the masking unit completely energized to provide a pseudo telephoto format akin to a 200 mm focal length, which is the situation when the cam ring is in its 200 mm pseudo telephoto setting. In this instance, all of the elongate strips and all of the right-angle strips are visible in the finder field.

In contrast to the electrically controlled LCD masking unit 51, a mechanically controlled masking unit may be provided in the viewfinder 10 of the camera 1. An example of a mechanical unit is shown in U.S. Pat. No. 3,212,422, granted Oct. 19, 1965. Alternatively, in place of the LCD masking unit 51, there may be provided a viewfinder having a manually operated carriage or slide on which is mounted a series of lenses and/or apertures of different sizes corresponding to the pseudo telephoto and pseudo panoramic formats. The slide would be supported for movement across the viewing axis of the viewfinder to locate the respective lenses and/or apertures at the axis to see a selected pseudo format in the viewfinder. In addition to the lenses and/or apertures for viewing the pseudo formats, the slide may include one or more lenses for viewing regular formats, e.g., 50 mm.

Four light emitting diodes (LED's) 59, 61, 63 and 65 are disposed in evenly spaced relation in the camera 1 for selective energization to spot-expose one of several possible code fiducials in binary form on a sensitive film area adjacent the film frame F, as shown in FIG. 4. Selective energization of the LED's 59, 61, 63 and 65 is controlled by individually closing respective switches SW1, SW2, SW3 and SW4. The closing of a switch SW1, SW2, SW3 or SW4 may be effected by a single closure member, not shown, on the cam ring 27 as the cam ring is positioned selectively in its pseudo panoramic and pseudo telephoto settings, i.e., pan, 120 mm, 160 mm and 200 mm. The binary form of the resulting code fiducial adjacent the film frame F indicates the particular pseudo setting of the cam ring 27, that is, the selected pseudo format. When the cam ring 27 is in its pseudo panoramic setting, the switch SW1 is closed and the LED 59 is energized. Thus, the binary form of the code fiducial is 1000. When the cam ring 27 is in its 120 mm, 160 mm or 200 mm pseudo telephoto settings, the switches SW2, SW3 or SW4 are closed and the LED's 61, 63 or 65 are energized, respectively. Thus, the binary form of the code fiducial is 0100, 0010 or 0001. When the cam ring 27 is rotated from its 35 mm setting to its 80 mm setting or vice-versa, the switches SW1-SW4 are open and none of the LED's are energized. Thus, the binary form of the code fiducial is, in effect, 0000.

Although not shown, it may be desirable for the LED 59 to be energized each time the cam ring 27 is in a pseudo panoramic or pseudo telephoto setting. In this instance, the LED 59 would provide a reference or pseudo-indicator fiducial for use in the printing process and the LED's 61, 63 and 65 would provide the code fiducials. Thus, the various codings might be 1000, 1100, 1010 and 1001 for the panoramic, 120 mm, 160 mm and 200 mm pseudo settings, respectively.

Besides controlling selective energization of the LED's 59, 61, 63 and 65 in accordance with rotation of the cam ring 27 to its pseudo panoramic and pseudo telephoto settings, the switches SW1-SW4 similarly control selective energization of the right-angle strips 55 and the elongate strips 57 of the LCD masking unit 51. Thus, the resulting code fiducial 1000, 0100, 0010 or 0001 adjacent the film frame F will be consistent with the masking configuration in the finder field 53 of the viewfinder 10.

Figure 8:
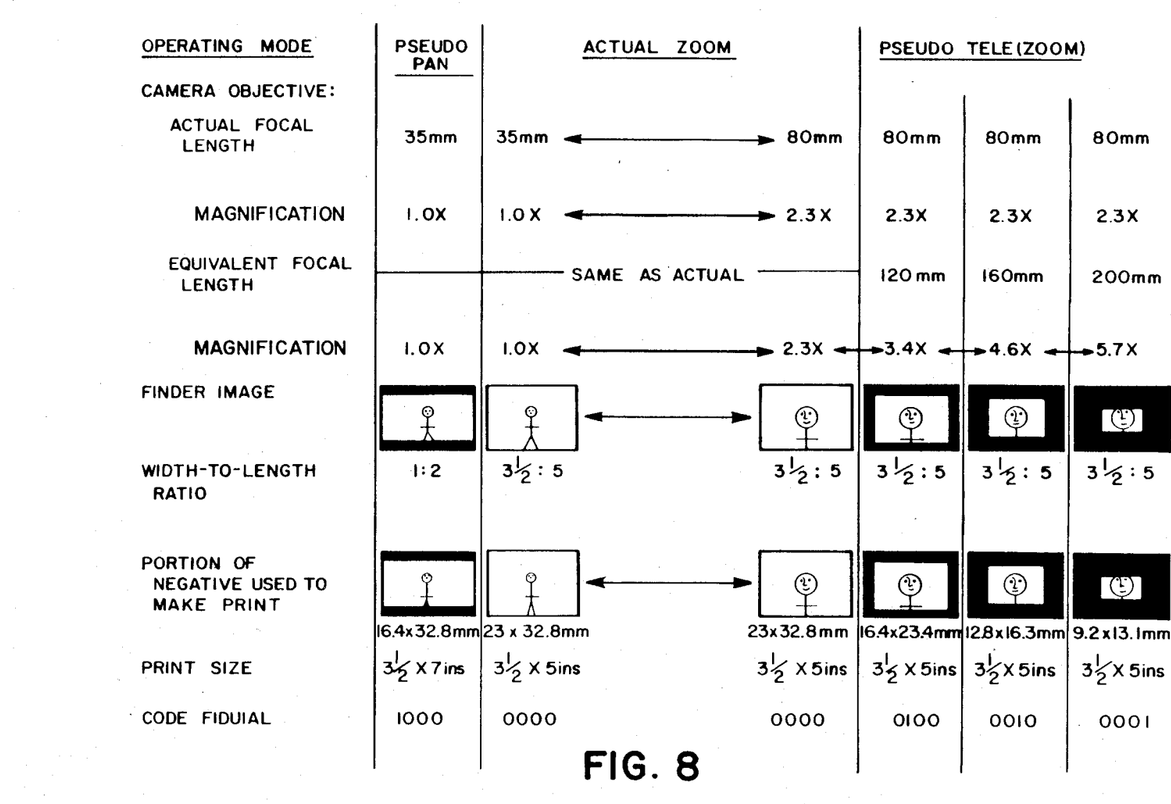
FIG. 8 is a chart for explaining how pseudo telephoto and pseudo panoramic prints are produced from film exposed in the camera.

Referring now to FIG. 8, there is shown a chart for understanding how the camera 1 is used to exposure film frames from which pseudo panoramic and pseudo telephoto prints (as well as actual wide-angle to actual telephoto prints) can be obtained. For the most part, the chart is self-explanatory. For example, when the cam ring 27 is in its pseudo panoramic setting, the actual focal length of the objective lens 3 is the wide angle limit 35 mm. The finder field 53 is masked, as indicated, and the code fiducial 1000 is exposed adjacent the film frame F in response to the closing of the switch SW1. During the printing operation, sensing of the code fiducial 1000 causes the negative to be masked along its upper and lower marginal zones, as indicated, in conformity with the masking of the finder field 53. An enlargement is made of the narrowed, non-masked portion of the negative, i.e., 16.4×32.8 mm, to provide a pseudo panoramic 3½×7 ins. print similar to one obtained from an exposure made with a panoramic (rather than a 35 mm) lens. When the cam ring 27 is in its 200 mm psuedo telephoto setting, the actual focal length of the objective lens 3 is the telephoto limit 80 mm. The finder field 53 is masked, as indicated, and the code fiducial 0001 is exposed adjacent the film frame F in response to the closing of the switch SW4. During the printing operation, sensing of the code fiducial 0001 causes the negative to be masked along its upper, lower, left and right marginal zones, as indicated, in conformity with the masking of the finder field. An enlargement is made of the central, non-masked portion of the negative, i.e., 9.2×13.1 mm, to provide a pseudo telephoto 3½×5 ins. print similar to one obtained from an exposure made with a 200 mm (rather than a 80 mm) lens. When the cam ring 27 is in its 120 mm telephoto setting, the actual focal length of the objective lens 3 is the telephoto limit 80 mm. The finder field 53 is masked, as indicated, and the code fiducial 0100 is exposed adjacent the film frame F in response to the closing of the switch SW2. During the printing operation, sensing of the code fiducial 0100 causes the negative to be masked along its upper, lower, left and right marginal zones, as indicated, in conformity with the masking of the finder field. An enlargement is made of the central, non-masked portion of the negative, i.e., 16.4×23.4 mm, to provide a pseudo telephoto 3½×5 ins. print similar to one obtained from an exposure made with a 120 mm (rather than a 80 mm) lens. When the cam ring is rotated from its 35 mm setting to its 80 mm setting or vice-versa, the focal length of the objective lens 3 is continuously changed between 35 mm and 80 mm. The finder field is not masked and no code fiducial (0000) is exposed on the film frame F, since each of the switches SW1-SW4 is open. Thus, an enlargement is made of a substantial portion of the negative, i.e., 23×32.8 mm.

Figure 2:
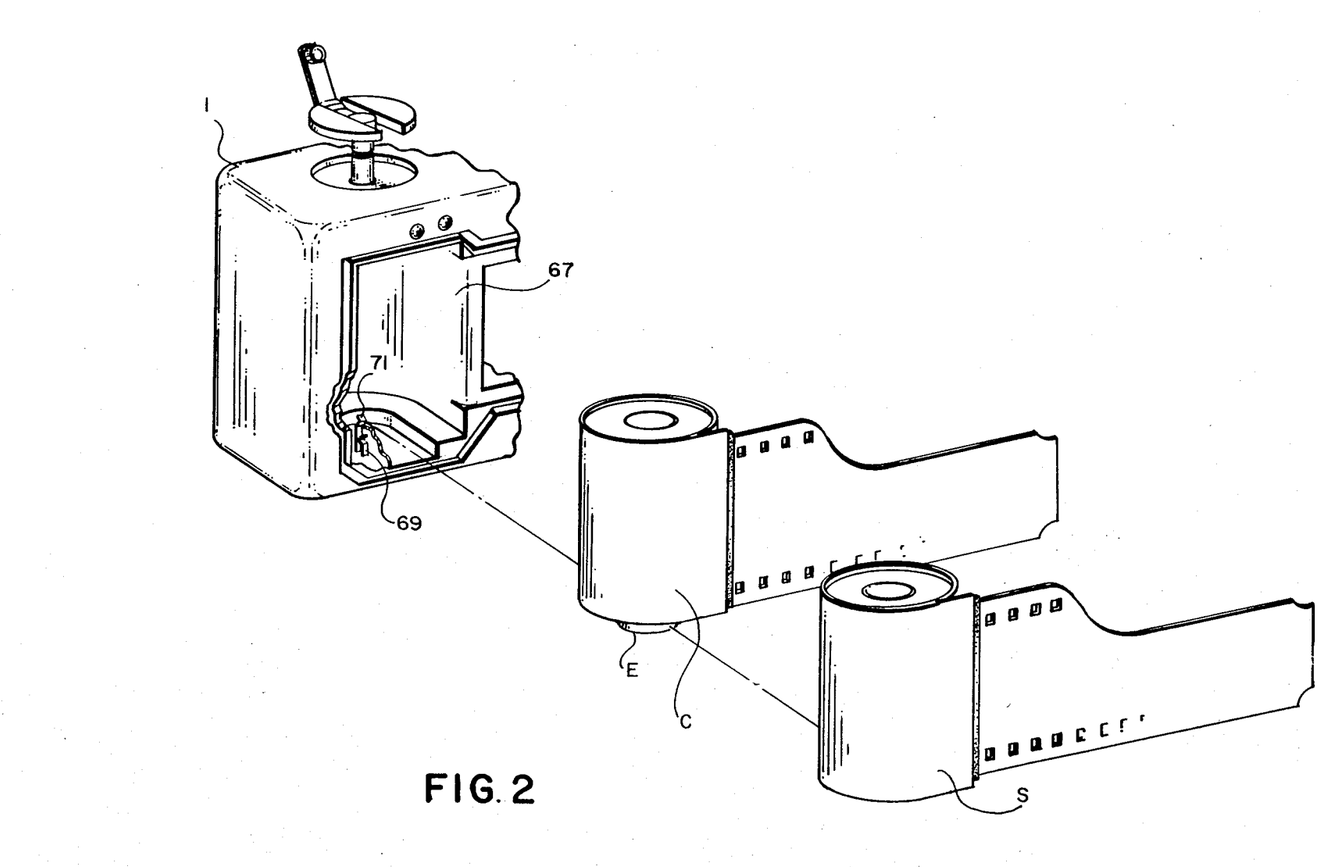
FIG. 2 is a rear perspective view of a loading chamber in the camera, depicting the manner in which either a conventional cartridge or the special cartridge may be inserted into the loading chamber.
Figure 3A:
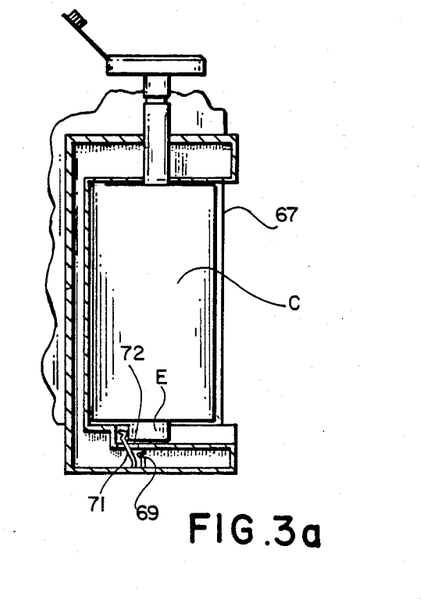
FIGS. 3a and 3b are side elevation views, partly in section, of the loading chamber with the respective cartridges.
Figure 3B:
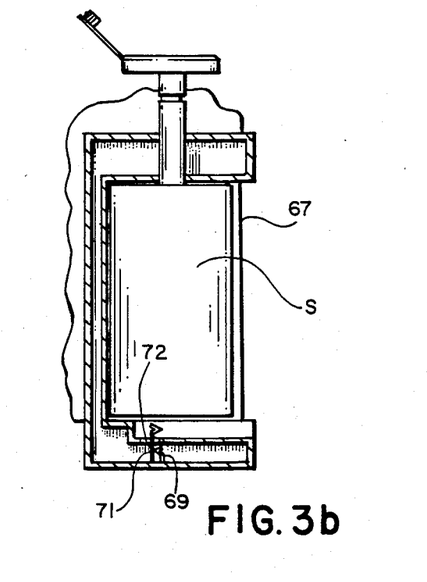

As shown in FIGS. 2, 3a and 3b, the camera 1 includes a rear loading chamber 67 adapted to receive either a conventional (standard) 35 mm film cartridge C or a special (unique) 35 mm film cartridge S. Bi-state switching means for distinguishing between the special and conventional cartridges C and S is preferably in the form of a relatively short, rigid switching element 69 located beneath the loading chamber 67 and a relatively long, flexible switching element 71 extending into the loading chamber through a narrow opening 72 in the bottom of the chamber. The two switching elements 69 and 71 complete respective electrical circuits for the LCD masking unit 51 and the LED's 59, 61, 63 and 65, and normally are in conductive contact to enable selective energization of the masking unit and the LED's when the cam ring 27 is positioned in any one of its pseudo panoramic or pseudo telephoto settings and a corresponding one of the switches SW1, SW2, SW3 or SW4 is closed. When, however, the flexible switching element 71 is separated from the shorter switching element 69, neither the LCD masking unit 51 nor the LED's 59, 61, 63 and 65 can be selectively energized, even though the switches SW1, SW2, SW3 or SW4 may be closed. Thus, with the two switching element 69 and 71 separated, the camera 1 can only be operated in a normal (non-pseudo telephoto/panoramic) picture-taking mode.

The special cartridge S is physically distinguished from the conventional cartridge C preferably by the absence of a standard spool extension E which projects from one end of the conventional cartridge. As a result, insertion of the special cartridge S into the loading chamber 67 of the camera 1, generally in the direction shown by the arrow D in FIG. 3b, does not disturb the conductive contact between the two switching elements 69 and 71. Conversely, as shown in FIG. 3a, insertion of the conventional cartridge C into the loading chamber 67, in the same direction D, causes its spool extension E to separate the flexible switching element 71 from the shorter switching element 69 and thereby break such conductive contact. Thus, with the conventional cartridge C, the camera 1 can only take exposures for use in producing normal (non-pseudo) prints, since the LCD masking unit 51 and the LED's 59, 61, 63 and 65 are disabled when the two switching elements 69 and 71 are separated.

The special cartridge C is physically distinguished from the conventional cartridge C substantially for two reasons. The first reason is to permit the camera 1 to operate in the pseudo format mode only with the special cartridge S and not with the conventional cartridge C. The second reason is to provide a means of identifying the special cartridge S to route it at the photofinisher to special equipment for producing pseudo panoramic and pseudo telephoto prints.

Figure 9:
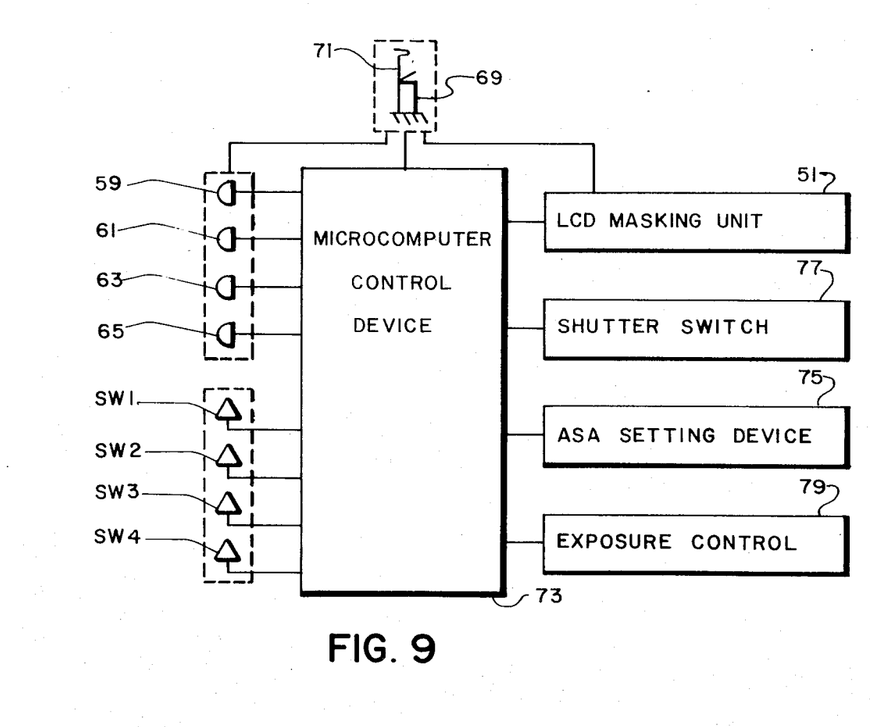
FIG. 9 is a schematic diagram of control circuitry in the camera.

FIG. 9 depicts a known microcomputer control device 73 for use with the LCD masking unit 51, the LED's 59, 61, 63 and 65 and the two switching elements 69 and 71. Examples of microcomputer-controlled cameras are disclosed in U.S. Pat. Nos. 4,295,715 and 4,509,843. A known ASA (film speed) setting device 75 is connected to the microcomputer device 73 to limit the intensity of an energized LED in accordance with the particular film speed of the 35 mm film loaded in the camera 1. A shutter switch 77 is connected to the microcomputer device 73 to delay energization of an LED, even though one of the switches SW1-SW4 is closed, until a focal plane shutter, not shown, is opened to take an exposure. When the focal plane shutter is opened, the shutter switch 77 is closed to energize an LED. Conversely, closing of the focal plane shutter causes the shutter switch 77 to re-open, thereby de-energizing the LED. A conventional exposure control circuit 79 is connected to the microcomputer device 73 to control the diaphragm aperture and the shutter speed. Such a circuit is disclosed, for example, in U.S. Pat. Nos. 4,493,547 and 4,515,457. The microcomputer device 73 may include a typical look-up table of exposure values which are individually selected according to which one of the switches SW1-SW4 is closed and the measure of brightness of reflected light provided by a photocell in the exposure control circuit 79. The selected exposure value is inputted to the exposure control circuit to set the diaphragm aperture and the shutter speed.

Figure 10A:
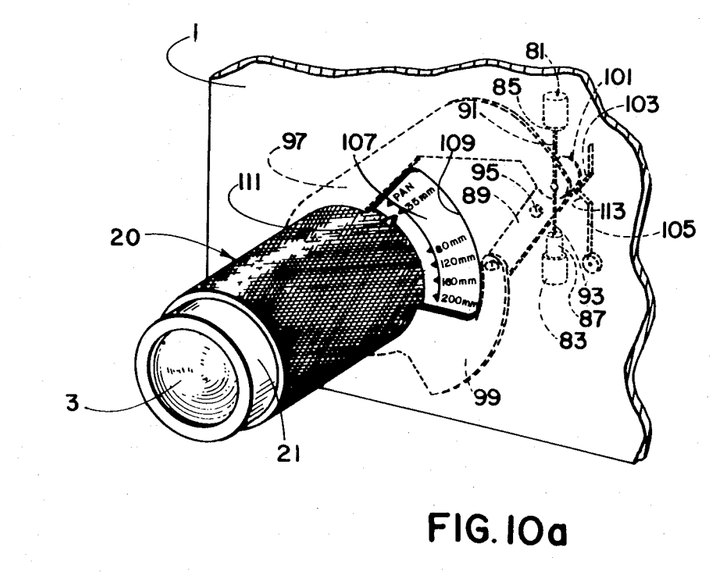
FIGS. 10a and 10b are front perspective views of a camera, according to an alternate embodiment of the invention.
Figure 10B:
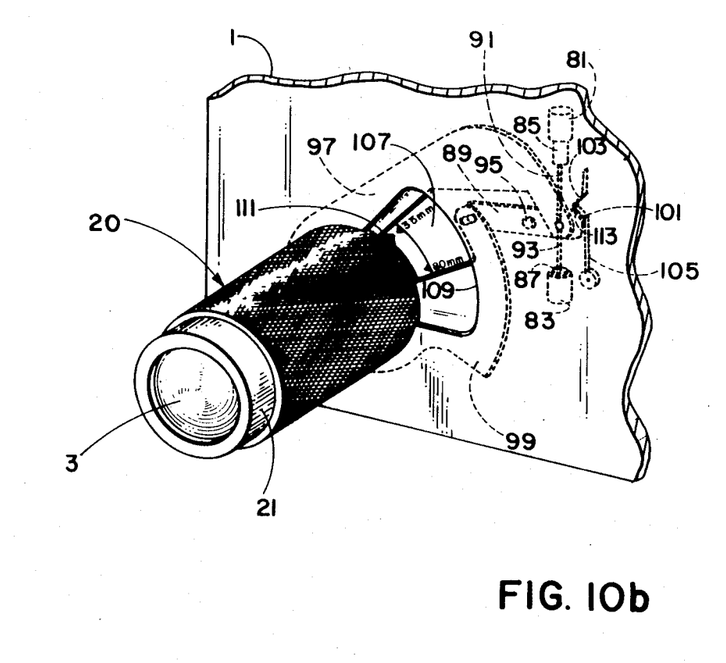

FIGS. 10a and 10b depict an alternate embodiment for permitting selective energization of the LCD masking unit 51 and the LED's 59, 61, 63 and 65 whenever the special cartridge S is in the loading chamber 67 of the camera 1, but preventing selective energization of the masking unit and the LED's whenever a conventional cartridge C is in the loading chamber. Like components in FIG. 9 which are shown in any of the other FIGS. have the same reference numbers. According to the alternate embodiment, the camera 1 includes a pair of solenoids 81 and 83 having respective cores 85 and 87 which are spring-biased outwardly of the housings for the solenoids. Each of the cores 85 and 87 is coupled to a swing bar 89 by separate links 91 and 93. The swing bar 89 is pivotally supported at a mounting pin 95 and is coupled on either side of the pin to a pair of blind-stops 96 and 99. Energization of the solenoid 81 draws its core 85 inwardly in opposition to the reverse spring urging to pivot the swing bar 89 in a counter-clockwise direction about the pin 95, as viewed in FIG. 10a, positioning a free end 101 of the swing bar at one side 103 of a crimp in a detent spring 105. Simultaneously, the blind-stops 97 and 99 are rotated away from each other about the manually operated means 20 to uncover the respective visible indications of the pseudo telephoto settings 120 mm, 160 mm and 200 mm and the pseudo panoramic setting of the cam ring 27. The pseudo telephoto and panoramic indications are embossed on a plate 107 within an opening 109 in the front face of the camera body. As shown in FIG. 10a, a pointer 111 on the zoom ring 25 is located within the opening 109 to move over the plate 107 into alignment with each of the pseudo telephoto and panoramic indications as the zoom ring is rotated. De-energization of the solenoid 81 does not change the positions of the swing bar 89 and the blind-stops 97 and 99, since the core 85 is spring biased outwardly to then hold the free end 101 of the swing bar against the side 103 of the crimp in the detent spring 105.

In FIG. 10b, energization of the solenoid 83 draws its core 87 inwardly to pivot the swing bar 89 in a clockwise direction about the pin 95, moving the free end 101 of the swing bar over the crimp in the detent spring 105 and positioning the free end at the other side 113 of the crimp. Simultaneously, the blind-stops 97 and 99 are rotated towards each other about the manually operated means 20 to cover the pseudo telephoto and panoramic indications embossed on the plate 107 and to block movement of the pointer 111 beyond respective similarly embossed indications of the 35 mm and 80 mm settings of the cam ring 27. Since the pointer 111 is fixed to the zoom ring 25, the cam ring 27 cannot be rotated to its pseudo panoramic setting or to any one of its pseudo telephoto settings. Thus, selective energization of the LCD masking unit 51 and the LED's 59, 61, 63 and 65 is prevented.

Although not shown, a typical power-on switch would be included in the camera 1 which, in addition to other purposes, could serve to momentarily energize the solenoid 81, assuring that the camera is in condition for use with the special cartridge S. When, however, a conventional cartridge C is used with the camera, another switch in the loading chamber 67 of the camera 1 would be closed to momentarily energize the solenoid 83. De-energization of either solenoid could be effected by the microcomputer device shown in FIG. 8.

While the invention has been described with reference to preferred and alternate embodiments, it will be understood that various modifications may be effected within the ordinary skill in the art without departing from the scope of the invention. For example, instead of the preferred physical variation which distinguishes the special cartridge S from the conventional cartridge C, other physical variations may be provided, such as a code patch in the DX encoded area on the metallic can of a Kodacolor VR DX 35 mm film cartridge, manufactured by Eastman Kodak Company.

According to another modification, a manually operated slide having a series of lenses and/or apertures corresponding to the pseudo telephoto and pseudo panoramic formats is movable across the viewing axis of the camera viewfinder to see a selected pseudo format in the viewfinder. A cam member extending into the loading chamber of the camera operates to move a retaining member to lock the slide in a position with its lenses and/or apertures corresponding to the pseudo formats removed from the viewing axis of the viewfinder whenever a conventional 35 mm film cartridge is inserted into the loading chamber.

I claim:

1. A photographic camera for use with (a) a conventional film cartridge for taking exposures for use in producing a normal print from a negative and (b) a special film cartridge, distinguishable from the conventional cartridge, for taking exposures for use in producing a pseudo telephoto print from a selected portion of a negative, said camera comprising:
   means defining a loading chamber for receiving either a conventional cartridge or a special cartridge;
   an objective lens;
   manually operated means for selecting a pseudo telephoto field of view reduced from the actual field of view of said objective lens;
   code means, responsive to operation of said manually operated means to select a pseudo telephoto field of view, for encoding an exposure with indicia representative of the pseudo telephoto field of view, to identify the portion of a negative covered by the pseudo telephoto field of view for producing a pseudo telephoto print from said portion; and
   control means for distinguishing between a conventional cartridge received in said loading chamber and a special cartridge received in the loading chamber for preventing operation of said manually operated means to select a pseudo telephoto field of view whenever the received cartridge is a conventional one, whereby exposures taken on film in a conventional cartridge cannot be used to produce pseudo telephoto prints.

2. A photographic camera for use with (a) a conventional film cartridge for taking exposures for use in producing a normal print from a negative and (b) a special film cartridge, distinguishable from the conventional cartridge, for taking exposures for use in producing a pseudo telephoto or pseudo panoramic print from a selected portion of a negative, said camera comprising:
   means defining a loading chamber for receiving either a conventional cartridge or a special cartridge;
   an objective lens;
   manually operated means supported for movement to respective positions corresponding to pseudo telephoto or pseudo panoramic fields of view reduced from the actual field of view of said objective lens to select a pseudo field of view;
   a viewfinder including optical means, responsive to movement of said manually operated means to a position corresponding to a selected pseudo field of view, for reducing the finder field of view to see the selected pseudo field of view in said viewfinder;
   code means, responsive to movement of said manually operated means to a position corresponding to a selected pseudo field of view, for encoding an exposure with indicia representative of the selected pseudo field of view, to identify the portion of a negative covered by the pseudo field of view for producing a pseudo telephoto or pseudo panoramic print from said portion; and
   control means for distinguishing between a conventional cartridge received in said loading chamber and a special cartridge received in said loading chamber to disable said optical means and said code means whenever the received cartridge is a conventional one, whereby exposures taken on film in a conventional cartridge cannot be used to produce pseudo telephoto or pseudo panoramic prints.

3. A photographic camera as recited in claim 2, wherein said control means includes stop means for preventing movement of said manually operated means to its positions corresponding to the pseudo fields of view to disable said optical means and said code means whenever a conventional cartridge is received in said loading chamber.

4. A photographic camera as recited in claim 2, wherein said control means includes bi-state switching means located in said loading chamber and having one state for enabling said optical means and said code means and another state for disabling the optical means and the code means, said bi-state switching means being in its one state whenever the cartridge in said loading chamber is a special one and being in its other state whenever the cartridge in the loading chamber is a conventional one.

5. A photographic camera as recited in claim 2, wherein said optical means includes masking means adjustable to respective masking configurations corresponding to the pseudo fields of view, and said control means prevents adjustment of said masking means whenever the cartridge in said loading chamber is a conventional one.

6. A photographic camera for use with (a) a conventional film cartridge for taking exposures for use in producing normal prints and (b) a special film cartridge, distinguishable from the conventional cartridge, for taking exposures for use in producing pseudo telephoto or pseudo panoramic prints, said camera comprising:
   means defining a loading chamber for receiving either a conventional cartridge or a special cartridge;
   an objective lens;
   manually operated means for selecting a pseudo telephoto or pseudo panoramic field of view reduced from the actual field of view of said objective lens;
   a viewfinder including optical means, responsive to operation of said manually operated means to select a pseudo field of view, for reducing the finder field of view to see the selected pseudo field of view in said viewfinder;
   code means, responsive to operation of said manually operated means to select a pseudo field of view, for encoding an exposure with indicia representative of the selected pseudo field of view to identify the portion of the exposure covered by the pseudo field of view;

means activatable for preventing operation of said manually operated means to select a pseudo field of view; and control means extending into said loading chamber to distinguish between a conventional cartridge received in the chamber and a special cartridge received in said chamber for activating said preventing means whenever the received cartridge is a conventional one, whereby operation of said manually operated means is prevented to select a pseudo field of view.

7. A photographic camera as recited in claim 6, wherein said manually operated means is supported for movement to a position corresponding to the actual field of view of said objective lens and to respective positions corresponding to the pseudo fields of view, said preventing means includes means activatable for retaining the manually operated means to prevent its movement to said positions corresponding to the pseudo fields of view, and said control means actuates said retaining means whenever the cartridge in said loading chamber is a conventional one.

8. The combination of a special cartridge containing film on which exposures may be made for use in producing pseudo telephoto or pseudo panoramic prints and a photographic camera adapted to receive said special cartridge and a conventional cartridge containing film on which exposures may be made for use in producing normal prints, wherein:

said special cartridge has a physical characteristic distinguishing it from the conventional cartridge; and said camera includes:

an objective lens;

manually operated means for selecting a pseudo telephoto or pseudo panoramic field of view reduced from the actual field of view of said objective lens;

code means, responsive to operation of said manually operated means to select a pseudo telephoto or pseudo panoramic field of view, for encoding an exposure on film in a special cartridge received in said camera with indicia representative of the selected pseudo field of view; and control means for distinguishing between a conventional cartridge received in said camera and a special cartridge received in the camera for preventing operation of said manually operated means to select a pseudo field of view whenever the received cartridge is a conventional one and permitting operation of the manually operated means to select a pseudo field of view whenever the received cartridge is a special one.

9. The combination as recited in claim 8, wherein said physical characteristic of the special cartridge distinguishing it from a conventional cartridge is the absence of a spool extension projecting from one end of the conventional cartridge, and said control means distinguishes between the presence and absence of a spool extension on a cartridge received in said camera.

* * * * *